UNITED STATES PATENT OFFICE.

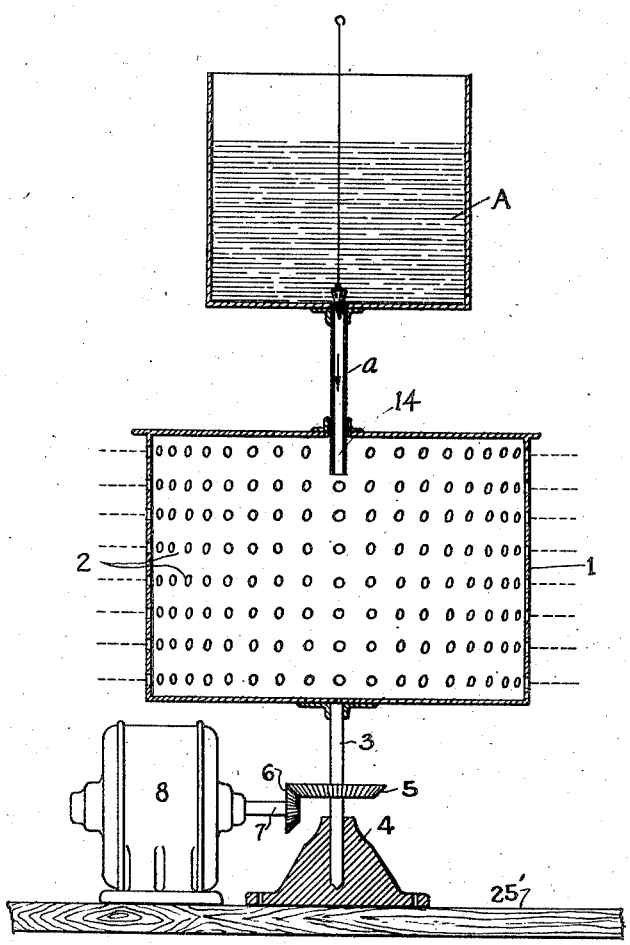

RAY P. PERRY, OF UPPER MONTCLAIR, NEW JERSEY, ASSIGNOR TO THE BARRETT COMPANY, A CORPORATION OF NEW JERSEY.

CAUSTIC MATERIAL IN SUBDIVIDED FORM.

1,312,201.    Specification of Letters Patent.    Patented Aug. 5, 1919.

Application filed December 3, 1917.    Serial No. 205,144.

*To all whom it may concern:*

Be it known that I, RAY P. PERRY, a citizen of the United States, residing at Upper Montclair, in the county of Essex and State of New Jersey, have invented certain new and useful Improvements in Caustic Materials in Subdivided Form, of which the following is a specification.

My invention comprises a method of treating caustic alkalis, such as the hydroxids of potassium, sodium, lithium, cæsium and rubidium, whereby these materials are readily and simply obtained in a subdivided form, and my invention comprises also such materials in the form just described.

For many purposes it is desirable to provide the caustic alkalis referred to above in a subdivided form, in which form they may be readily handled especially for preparing solutions of the same.

I have discovered that when any of the materials referred to above is fused, and the fused material is ejected in the form of fine streams, as in the form of a spray, into a cooling medium such as cold air, the fused material is solidified in a peculiar form resembling short, fiber-like particles which are readily handled and which enable the material to be readily dissolved in the preparation of caustic solutions.

Referring to the drawing, wherein I have diagrammatically illustrated a form of apparatus for carrying out the process of my invention in the production of the article of my invention, A indicates any suitable source of fused caustic alkali. Instead of being sent into molds where it is cooled and solidified in comparatively large masses, according to my process the fused caustic alkali is sent into a spraying or analogous device. While various types of spraying or analogous devices may be used, I prefer to use a device of the sort illustrated in the drawing. The fused caustic alkali coming through the pipe *a* is delivered through the outlet 14 into the cylindrical or other container 1 having one or more rows of apertures 2 substantially horizontally disposed. The container 1 is driven or rotated at any desired rate of speed by being mounted on the shaft 3 which is supported in the bearing 4. Fixedly mounted on the shaft 3, a small distance above the bearing 4, is a bevel gear 5 which meshes with a corresponding bevel gear 6, which is fixed on the shaft 7 of an electric or other motor 8. By setting the motor 8 in operation it is obvious that the container 1 will be rotated through the mediation of the bevel gears 5 and 6.

In operation the fused caustic material, such as fused caustic soda, for example, is fed through the outlet 14 into the container 1. The container 1 is rapidly rotated at any desired rate of speed by the meshing bevel gears 5 and 6 which are set in motion by the motor 8. Due to the centrifugal force of the rapidly rotating container 1 the fused caustic alkali is forced or extruded through the apertures 2, which are of predetermined size, in the form of streams of fused caustic alkali, which streams when they are injected into the air, which serves as a cooling medium, break up into short, fiber-like particles. The particles thus formed fall in a solidified condition upon the floor or other support 25' where they are gathered together and used for any desired purpose.

What I claim is:

1. The herein described product, comprising caustic alkali in the form of comparatively short, solid fiber-like particles.

2. The herein described product, comprising caustic soda in the form of comparatively short, solid fiber-like particles.

In testimony whereof I affix my signature.

RAY P. PERRY.